US009670883B2

(12) United States Patent
Matsuishi et al.

(10) Patent No.: US 9,670,883 B2
(45) Date of Patent: Jun. 6, 2017

(54) ENGINE

(71) Applicant: KUBOTA Corporation, Osaka-shi, Osaka (JP)

(72) Inventors: Kazumichi Matsuishi, Osaka (JP); Tetsuya Kosaka, Osaka (JP); Tomohiro Ninomiya, Osaka (JP); Yusuke Suzuki, Osaka (JP); Toshio Nakanishi, Osaka (JP); Yongchol Lee, Osaka (JP); Takashi Kushigemachi, Osaka (JP)

(73) Assignee: KUBOTA Corporation, Osaka-shi, Osaka (JP)

(*) Notice: Subject to any disclaimer, the term of this patent is extended or adjusted under 35 U.S.C. 154(b) by 246 days.

(21) Appl. No.: 14/455,421

(22) Filed: Aug. 8, 2014

(65) Prior Publication Data

US 2015/0082772 A1    Mar. 26, 2015

(30) Foreign Application Priority Data

Sep. 26, 2013  (JP) ................................ 2013-199222
Mar. 31, 2014  (JP) ................................ 2014-074652

(51) Int. Cl.
*F02M 25/07* (2006.01)
*F01P 3/20* (2006.01)
(Continued)

(52) U.S. Cl.
CPC ......... *F02M 25/0731* (2013.01); *F01N 3/021* (2013.01); *F02M 25/06* (2013.01);
(Continued)

(58) Field of Classification Search
CPC ........... F02M 25/0731; F02M 25/0703; F02M 25/072; F02M 25/0737; F02M 35/1022;
(Continued)

(56) References Cited

U.S. PATENT DOCUMENTS 7,388,712 B2 * 6/2008 Lee .................... G02B 21/0044
                                                    359/233
8,388,712 B2 * 3/2013 Zhang .................. F01N 3/0233
                                                    55/282.3
(Continued)

FOREIGN PATENT DOCUMENTS

DE    102005002266 A1    7/2006
EP        2397677 A1    12/2011
(Continued)

OTHER PUBLICATIONS

Extended Search Report issued Dec. 17, 2015 in EP Application No. 14179702.7.

*Primary Examiner* — Long T Tran
(74) *Attorney, Agent, or Firm* — Panitch Schwarze Belisario & Nadel LLP

(57) ABSTRACT

An engine includes an engine body, a DPF case therein, high pressure and low pressure EGR paths, and a supercharger. The high pressure EGR path is between exhaust and intake manifolds. An exhaust gas discharge path extends from the DPF case. An intake pipe extends from the supercharger air compressor. The low pressure EGR path is between the exhaust gas discharge path of the DPF case and the intake pipe. The low pressure EGR path includes a low pressure EGR cooler. An extending direction of a crankshaft defines a longitudinal direction. A flywheel exists on a rear side. A width direction of the engine body defines a lateral direction. The low pressure EGR path includes a rear path portion extending along a rear side of the engine body, and a side path portion extending along a lateral side of the engine body on a side close to the exhaust manifold.

21 Claims, 15 Drawing Sheets

(51) Int. Cl.

| | | |
|---|---|---|
| *F01N 3/033* | (2006.01) | |
| *F02M 35/10* | (2006.01) | |
| *F02M 25/06* | (2016.01) | |
| *F01N 3/021* | (2006.01) | |
| *F02M 26/12* | (2016.01) | |
| *F02M 26/05* | (2016.01) | |
| *F02M 26/06* | (2016.01) | |
| *F02M 26/15* | (2016.01) | |
| *F02M 26/17* | (2016.01) | |
| *F02M 26/28* | (2016.01) | |
| *F02M 26/24* | (2016.01) | |
| *F02M 26/32* | (2016.01) | |
| *F02M 26/35* | (2016.01) | |
| *F02M 26/72* | (2016.01) | |

(52) U.S. Cl.
CPC ............ *F02M 26/05* (2016.02); *F02M 26/06* (2016.02); *F02M 26/12* (2016.02); *F02M 26/15* (2016.02); *F02M 26/17* (2016.02); *F02M 26/24* (2016.02); *F02M 26/28* (2016.02); *F02M 26/32* (2016.02); *F02M 26/35* (2016.02); *F02M 26/72* (2016.02); *F02M 35/10222* (2013.01); *Y02T 10/121* (2013.01); *Y02T 10/20* (2013.01)

(58) Field of Classification Search
CPC ........... F02M 25/0707; F02M 25/0709; F02M 25/0717; F01N 3/021; F01N 3/0211; F01N 2450/24; F01N 2470/18; F01N 3580/24; F01N 2013/026; F01N 2450/30; F01N 13/143; F01N 13/1855
USPC ...... 123/568.11–568.32; 55/302, 303, 282.3; 60/274–287, 295, 605.2, 599
See application file for complete search history.

(56) References Cited

U.S. PATENT DOCUMENTS

| | | | | |
|---|---|---|---|---|
| 8,667,780 | B2* | 3/2014 | Hepburn | F01N 3/021 60/280 |
| 8,821,608 | B2* | 9/2014 | Mitsuda | F01N 3/0211 422/169 |
| 2010/0199839 | A1* | 8/2010 | Zhang | F01N 3/0233 95/23 |
| 2011/0072791 | A1* | 3/2011 | Bidner | B60K 6/485 60/278 |
| 2011/0072792 | A1* | 3/2011 | Bidner | F01N 3/30 60/278 |
| 2011/0167808 | A1 | 7/2011 | Kosaka et al. | |
| 2011/0296832 | A1* | 12/2011 | Pursifull | F02M 26/33 60/605.2 |
| 2012/0102932 | A1* | 5/2012 | Mitsuda | F01N 3/0211 60/311 |
| 2012/0117963 | A1* | 5/2012 | Hepburn | F01N 3/021 60/605.2 |
| 2013/0118162 | A1* | 5/2013 | Hepburn | F01N 3/021 60/602 |
| 2014/0331643 | A1* | 11/2014 | Reich | F02M 26/14 60/274 |

FOREIGN PATENT DOCUMENTS

| | | |
|---|---|---|
| JP | 2002188526 A | 7/2002 |
| JP | 2007-146774 A | 6/2007 |
| JP | 2008014232 A | 1/2008 |
| JP | 2013019279 A | 1/2013 |
| WO | 2010106869 A1 | 9/2010 |

\* cited by examiner

ENGINE

BACKGROUND OF THE INVENTION (1) Field of the Invention

The present invention relates to an engine, and more particularly, to an engine capable of downsizing a low pressure EGR (Exhaust Gas Recirculation) cooler.

(2) Description of Related Art

There is a conventional engine including an engine body, a DPF (Diesel Particulate Filter) case, a high pressure EGR path, a supercharger and a low pressure EGR path, in which the high pressure EGR path is interposed between an exhaust manifold and an intake manifold, an exhaust gas discharge path extends from the DPF case, an intake pipe extends from an air compressor of the supercharger, the low pressure EGR path is interposed between the exhaust gas discharge path and the intake pipe of the DPF case, and the low pressure EGR path is provided with a low pressure EGR cooler (see Japanese Patent Application Laid-open No. 2007-146774 A, for example).

The engine of this kind has a merit that high pressure EGR and low pressure EGR are properly used in accordance with an operation region of the engine, and an appropriate reduction effect of NOx can be obtained in the entire operation region of the engine.

However, the engine according to Japanese Patent Application Laid-open No. 2007-146774 A has a problem because the low pressure EGR path is configured so as to be short.

BRIEF SUMMARY OF THE INVENTION

<<Problem>> The low pressure EGR cooler is increased in size.

In the engine according to Japanese Patent Application Laid-open No. 2007-146774 A, since the low pressure EGR path is configured so as to be short, radiation performance from portions of the engine other than the low pressure EGR cooler is poor, a degree of dependence of radiation on the low pressure EGR cooler is high and the low pressure EGR cooler is increased in size.

It is an object of the present invention to provide an engine capable of downsizing the low pressure EGR cooler.

Means for Solving the Problem

A matter to define the invention is as follows.

As illustrated in FIGS. 1 and 2 or 9 and 10, an engine including an engine body 1, a DPF case 2, a high pressure EGR path 3, a supercharger 4 and a low pressure EGR path 5, in which the high pressure EGR path 3 is interposed between an exhaust manifold 6 and an intake manifold 7, an exhaust gas discharge path 8 extends from the DPF case 2, an intake pipe 9 extends from an air compressor 4a of the supercharger 4, the low pressure EGR path 5 is interposed between the exhaust gas discharge path 8 of the DPF case 2 and the intake pipe 9, and the low pressure EGR path 5 is provided with a low pressure EGR cooler 10, wherein the DPF case 2 is installed in the engine body 1, and when an extending direction of a crankshaft 11 is defined as a longitudinal direction and a flywheel 12 is defined as existing on a rear side and a width direction of the engine body 1 is defined as a lateral direction, the low pressure EGR path 5 includes a rear path portion 13 extending along a rear side of the engine body 1, and a side path portion 14 extending along a lateral side of the engine body 1 on a side close to the exhaust manifold 6.

Effect of the Invention

The invention has the following effects:

<<Effects>> It is possible to downsize the low pressure EGR cooler.

As illustrated in FIGS. 1 and 2 or 9 and 10, the DPF case 2 is installed in an engine body 1, the low pressure EGR path 5 includes a rear path portion 13 extending along a rear side of the engine body 1, and a side path portion 14 extending along a lateral side of the engine body 1 on a side close to the exhaust manifold 6. Therefore, although the DPF case 2 is installed in the engine body 1 and the engine has a compact shape, a path length of the low pressure EGR path 5 can be made long by the rear path portion 13 and the side path portion 14, radiation performance from portions of the engine other than the low pressure EGR cooler 10 is enhanced, the degree of radiation dependence on the low pressure EGR cooler 10 can be lowered and it is possible to downsize the low pressure EGR cooler 10.

It is possible to downsize the low pressure EGR cooler.

As illustrated in FIGS. 1 and 2 or 9 and 10, the low pressure EGR cooler 10 is placed on the side path portion 14 of the low pressure EGR path 5 at a position lower than an upper surface 15a of a cylinder head 15, a start end-close portion 13a of a rear path portion 13 of the low pressure EGR path 5 is placed right behind a cylinder head cover 16, a terminal end-close portion 13b of the rear path portion 13 is bent downward from the start end-close portion 13a, and a terminal end 13c of the rear path portion 13 is connected to the low pressure EGR cooler 10. Therefore, the path length of the rear path portion 13 becomes long by bending the terminal end-close portion 13b, radiation performance of the rear path portion 13 is enhanced, the degree of radiation dependence on the low pressure EGR cooler 10 can be lowered and it is possible to downsize the low pressure EGR cooler 10.

It is possible to maintain excellent cooling performance of the low pressure EGR cooler.

As illustrated in FIG. 2 or 10, engine cooling water which passes through a cooling water jacket of the cylinder head 15 is used as refrigerant of the low pressure EGR cooler 10 which is lower than an upper surface 15a of the cylinder head 15. Therefore, air and vapor which try to stay in the low pressure EGR cooler 10 easily pass through the cooling water jacket of the cylinder head 15, and it is possible to maintain the excellent cooling performance of the low pressure EGR cooler 10.

It is possible to downsize the low pressure EGR cooler.

As illustrated in FIG. 1 or 9, the exhaust gas discharge path 8 extends from a DPF case end 2a on a side close to the intake manifold 7, and the rear path portion 13 of the low pressure EGR path 5 branches off from the exhaust gas discharge path 8 on the side of the intake manifold 7. Therefore, the path length of the rear path portion 13 from the exhaust gas discharge path 8 on the side of the intake manifold 7 to the side path portion 14 on the side of the exhaust manifold 6 becomes long, the radiation performance of the rear path portion 13 is enhanced, the degree of radiation dependence on the low pressure EGR cooler 10 can be lowered, and it is possible to downsize the low pressure EGR cooler 10.

It is possible to keep an entire length of the engine short.

As illustrated in FIG. 12, the DPF case 2 is placed above the engine body 1, and the exhaust gas discharge path 8 and the rear path portion 13 of the low pressure EGR path 5 are placed below the DPF case 2 at positions overlapping with the DPF case 2 as viewed from directly above. Therefore, the exhaust gas discharge path 8 and the rear path portion 13 of the low pressure EGR path 5 do not largely project rearward more than the DPF case 2, and it is possible to keep the entire length of the engine short.

It is possible to keep an entire width of the engine short.

As illustrated in FIG. 4 or 12, the DPF case 2 is placed above the engine body 1, and a portion of the side path portion 14 of the low pressure EGR path 5 is placed at a position overlapping with the DPF case 2 as viewed from directly above. Therefore, the portion of the side path portion 14 does not largely project laterally more than the DPF case 2, and it is possible to keep the entire width of the engine short.

It is possible to keep the entire width of the engine short.

As shown in FIG. 4 or 12, the supercharger 4 is mounted on the exhaust manifold 6, and a portion of the side path portion 14 of the low pressure EGR path 5 is placed at a position overlapping with the supercharger 4 as viewed from directly above. Therefore, the portion of the side path portion 14 does not largely project laterally more than the supercharger 4, and it is possible to keep the entire width of the engine short.

It is possible to keep the entire length and the entire width of the engine short.

As illustrated in FIG. 12, the high pressure EGR path 3 is placed below the DPF case 2 at a position overlapping with the DPF case 2 as viewed from directly above. Therefore, the high pressure EGR path 3 does not largely project rearward and laterally more than the DPF case 2, and it is possible to keep the entire length and the entire width of the engine short.

It is possible to downsize the low pressure EGR cooler.

As illustrated in FIG. 2 or FIGS. 10 and 11, the side path portion 14 of the low pressure EGR path 5 includes a downward convex bypass path portion 14a which once moves downward and then moves upward, and an upper side terminal end 14b of the downward convex bypass path portion 14a is connected to the intake pipe 9. Therefore, a path length of the side path portion 14 becomes long by the downward convex bypass path portion 14a, the degree of radiation dependence on the low pressure EGR cooler can be lowered, and it is possible to downsize the low pressure EGR cooler 10.

It is possible to retard corrosion in the low pressure EGR cooler and a low pressure EGR valve case.

As illustrated in FIGS. 2, 3A and 3B or FIGS. 10 and 11, the low pressure EGR cooler 10 is placed upstream of the downward convex bypass path portion 14a, the low pressure EGR valve case 17 is placed on the downward convex bypass path portion 14a, and a lowest portion of the downward convex bypass path portion 14a is a condensed water reservoir 18 for condensed water which flows out from the low pressure EGR cooler 10 and the low pressure EGR valve case 17. Therefore, condensed water including sulfuric acid component is less prone to stay in the low pressure EGR cooler 10 and the low pressure EGR valve case 17, and it is possible to retard corrosion in the low pressure EGR cooler 10 and the low pressure EGR valve case 17.

It is possible to retard corrosion in the low pressure EGR valve case and an EGR valve.

As illustrated in FIGS. 2, 3A and 3B, the condensed water reservoir 18 is placed in a lower portion of the low pressure EGR valve case 17. Therefore, condensed water including sulfuric acid component does not stay in the low pressure EGR valve case 17, and it is possible to retard corrosion in the low pressure EGR valve case 17 and the EGR valve 17a.

It is possible to retard corrosion of a valve head of the EGR valve.

As illustrated in FIG. 3C, the low pressure EGR valve case 17 is oriented to a direction extending along a horizontal direction, and a valve stem 17b of an EGR valve 17a is also oriented to a direction extending along the horizontal direction. Therefore, there is no deficiency that condensed water including sulfuric acid component is guided to the valve head 17d of the EGR valve 17a along inclinations of the low pressure EGR valve case 17 and the valve stem 17b, and it is possible to retard corrosion of the valve head 17d of the EGR valve 17a.

Durability of a condensed water reservoir is high.

As illustrated in FIGS. 3A and 3B, the condensed water reservoir 18 is composed of a cast or forged water saucer. Therefore, durability of the condensed water reservoir 18 is high.

Maintenance in the low pressure EGR valve case and the EGR valve and replacement of the EGR valve are facilitated.

As illustrated in FIGS. 3A and 3B, the condensed water reservoir 18 is detachably mounted on the low pressure EGR valve case 17. Therefore, maintenance in the low pressure EGR valve case 17 and the EGR valve 17a and replacement of the EGR valve 17a are facilitated.

It is possible to retard corrosion in the low pressure EGR valve case.

As illustrated in FIGS. 10 and 11, the low pressure EGR valve case 17 downwardly inclines toward the condensed water reservoir 18. Therefore, condensed water 21 including sulfuric acid component is less prone to stay in the low pressure EGR valve case 17, and it is possible to retard corrosion in the low pressure EGR valve case 17.

It is possible to downsize the low pressure EGR cooler.

As illustrated in FIG. 2 or FIGS. 10 and 11, the lowest portion 14d of the downward convex bypass path portion 14a is placed at a position lower than the exhaust manifold 6, the supercharger 4 is placed on an upper portion of the exhaust manifold 6, the intake pipe 9 includes a diagonally upwardly extending inclined intake pipe portion 9a, and a terminal end 5a of the low pressure EGR path 5 is connected to the inclined intake pipe portion 9a. Therefore, the path length of the low pressure EGR path 5 becomes long by the diagonally upwardly extending inclined intake pipe portion 9a, radiation performance from portions of the engine other than the low pressure EGR cooler 10 is enhanced, the degree of radiation dependence on the low pressure EGR cooler 10 can be lowered, and it is possible to downsize the low pressure EGR cooler 10.

It is possible to downsize the low pressure EGR cooler.

As illustrated in FIGS. 10 and 11, a rising path portion 14c of the downward convex bypass path portion 14a is bent along a shape of the intake pipe 9. Therefore, a path length of the rising path portion 14c becomes long by the bent shape, radiation performance from portions of the engine other than the low pressure EGR cooler 10 is enhanced, the degree of radiation dependence on the low pressure EGR cooler 10 can be lowered, and it is possible to downsize the low pressure EGR cooler 10.

It is possible to keep the entire width of the engine short.

As illustrated in FIG. 4 or 12, a portion of the downward convex bypass path portion 14a is placed below the supercharger 4 at a position overlapping with the supercharger 4 as viewed from directly above. Therefore, the portion of the downward convex bypass path portion 14a does not largely project laterally more than the supercharger 4, and it is possible to keep the entire width of the engine short.

It is possible to keep the entire width of the engine short.

As illustrated in FIG. 4 or 12, a portion of the downward convex bypass path portion 14a is placed below the intake pipe 9 at a position overlapping with the intake pipe 9 as viewed from directly above. Therefore, the portion of the downward convex bypass path portion 14a does not largely project laterally more than the intake pipe 9, and it is possible to keep the entire width of the engine short.

It is possible to prevent freezing in the vicinity of a blow-by gas outlet when it is cold.

As illustrated in FIG. 3C or 11, during a predetermined period of an engine cold start warming-up period including an engine cold start period and a subsequent warming-up period, low pressure EGR gas 20 flows out from the low pressure EGR outlet 5b toward the blow-by gas outlet 19b. Therefore, the blow-by gas outlet 19b is heated by heat of the low pressure EGR gas 20, and it is possible to prevent freezing of the blow-by gas outlet 19b when it is cold.

It is possible to prevent the low pressure EGR outlet from becoming clogged.

As illustrated in FIG. 3C, the low pressure EGR outlet 5b which is oriented laterally is placed in a lateral peripheral wall 9f of the intake pipe 9. Therefore, water, oil and carbon in blow-by gas 22 which flow out from the blow-by gas outlet 19b are less prone to enter the low pressure EGR outlet 5b, and it is possible to prevent the low pressure EGR outlet 5b from becoming clogged.

It is possible to prevent the low pressure EGR outlet from becoming clogged.

As illustrated in FIG. 11, the intake pipe 9 includes a diagonally upwardly extending inclined intake pipe portion 9a, the low pressure EGR outlet 5b is placed in a lower peripheral wall 9c of the inclined intake pipe portion 9a, a blow-by gas outlet 19b is placed in an upper peripheral wall 9d of the inclined intake pipe portion 9a, and the low pressure EGR outlet 5b is placed at a position higher than a directly-below position 9e of the lower peripheral wall 9c, the directly-below position 9e being located directly below the blow-by gas outlet 19b. Therefore, water, oil and carbon in blow-by gas 22 which flow out from the blow-by gas outlet 19b are less prone to enter the low pressure EGR outlet 5b, and it is possible to prevent the low pressure EGR outlet 5b from becoming clogged.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 3 are diagrams for describing a low pressure valve case and a suction passage used in the engine shown in FIG. 1, wherein

DETAILED DESCRIPTION OF THE INVENTION

FIGS. 1 to 8 are diagrams for describing an engine according to a first embodiment of the present invention, and FIGS. 9 to 15 are diagrams for describing an engine according to a second embodiment of the invention. In these embodiments, water-cooling vertical type straight multicylinder diesel engines will be described.

The first embodiment will be described.

A general outline of an engine body is as follows.

Figure 1:
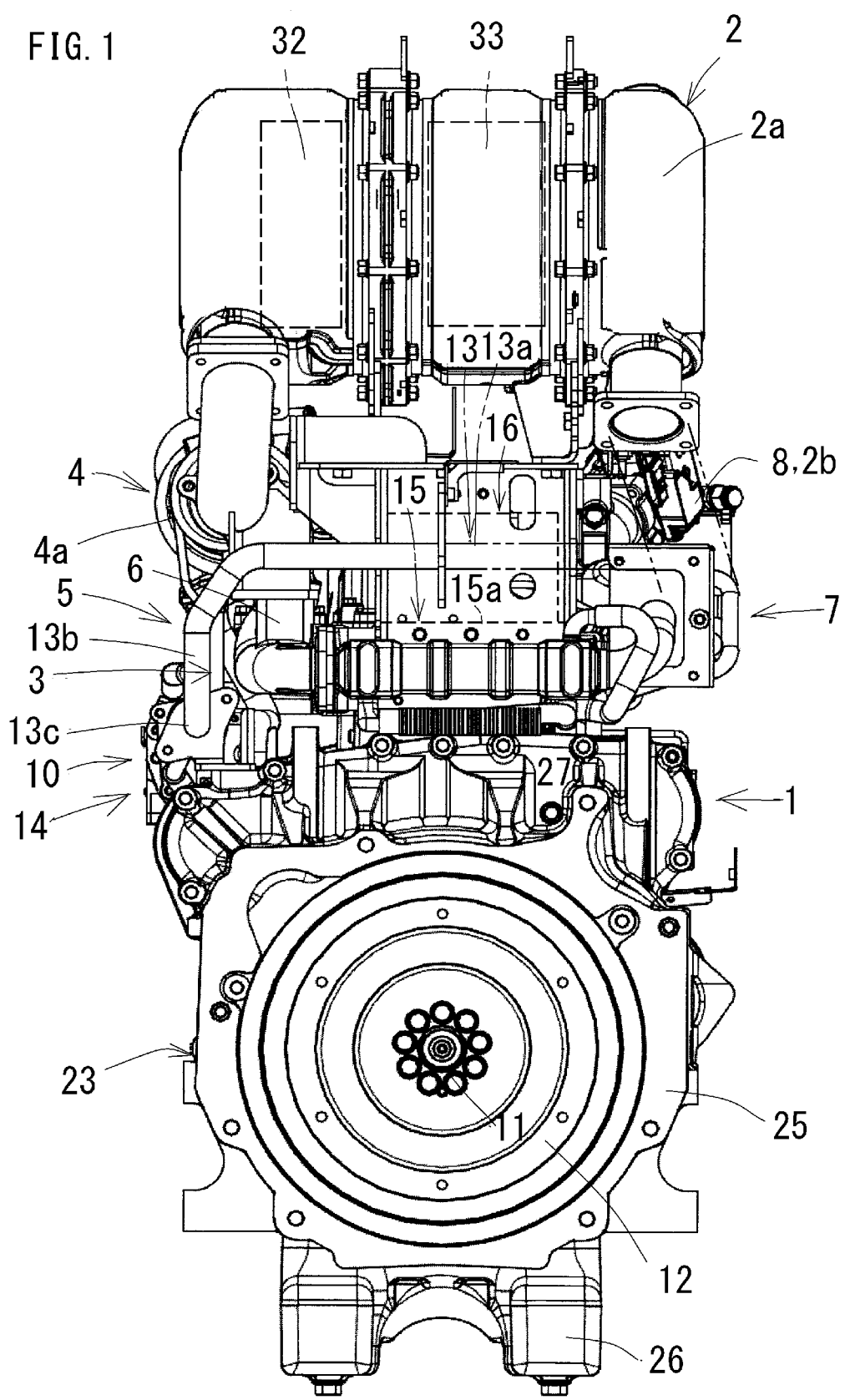
FIG. 1 is a back view of an engine according to a first embodiment of the present invention.
Figure 2:
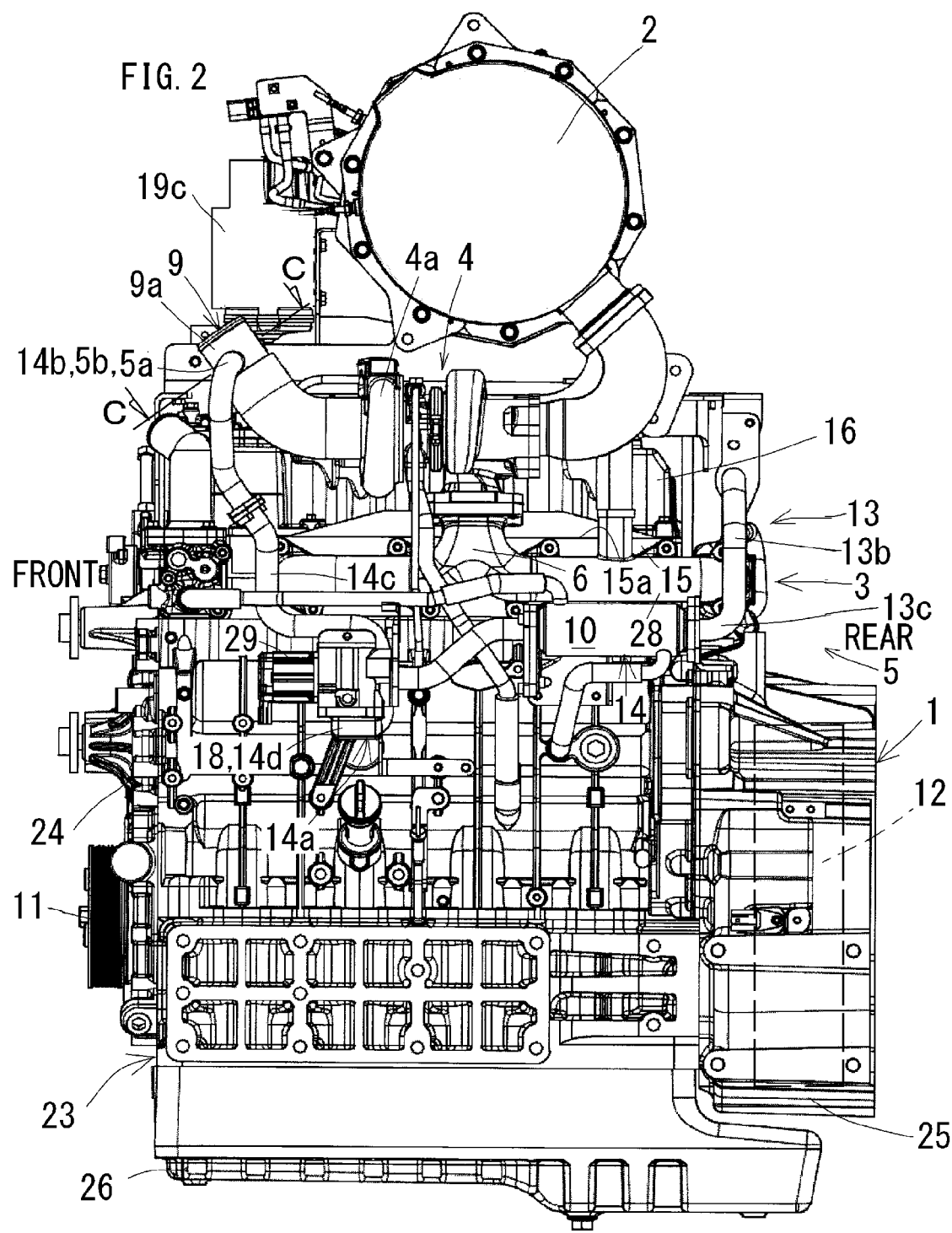
FIG. 2 is a right side view of the engine shown in FIG. 1.

As shown in FIGS. 1 and 2, a cylinder head 15 is assembled into an upper portion of a cylinder block 23, a cylinder head cover 16 is assembled into an upper portion of the cylinder head 15, a water pump case 24 is assembled into a front portion of the cylinder block 23, a flywheel housing 25 is placed on a rear portion of the cylinder block 23, a flywheel 12 is accommodated in the flywheel housing 25, and an oil pan 26 is assembled into a lower portion of the cylinder block 23.

An exhaust manifold 6 is assembled into one of lateral sides of the cylinder head 15, and an intake manifold 7 is assembled into the other lateral side.

A general outline of this engine is as follows.

As shown in FIGS. 1 and 2, the engine includes an engine body 1, a DPF case 2, a high pressure EGR path 3, a supercharger 4 and a low pressure EGR path 5.

The high pressure EGR path 3 is interposed between the exhaust manifold 6 and the intake manifold 7.

An exhaust gas discharge path 8 extends from the DPF case 2, an intake pipe 9 extends from an air compressor 4a of the supercharger 4, the low pressure EGR path 5 is interposed between the exhaust gas discharge path 8 and the intake pipe 9 of the DPF case 2, and the low pressure EGR path 5 is provided with a low pressure EGR cooler 10.

The engine body 1 is provided with the DPF case 2.

An extending direction of a crankshaft 11 is defined as a longitudinal direction, the flywheel 12 is defined as being on a rear side, and a width direction of the engine body 1 is defined as a lateral direction.

As shown in FIGS. 1 and 2, the low pressure EGR path 5 includes a rear path portion 13 extending along a rear side of the engine body 1, and a side path portion 14 extending along a lateral side of the engine body 1 on the side of the exhaust manifold 6.

According to this, although the engine body 1 is provided with the DPF case 2 and the engine has a compact shape, a path length of the low pressure EGR path 5 can be made long by the rear path portion 13 and the side path portion 14, radiation performance from portions of the engine other than the low pressure EGR cooler 10 is enhanced, a degree of radiation dependence on the low pressure EGR cooler 10 can be lowered, and it is possible to downsize the low pressure EGR cooler 10.

As shown in FIGS. 1 and 2, the low pressure EGR cooler 10 is placed on the side path portion 14 of the low pressure EGR path 5 at a position lower than an upper surface 15a of the cylinder head 15.

A portion close to a start end start end-close portion, hereinafter 13a of the rear path portion 13 of the low pressure EGR path 5 is placed right behind the cylinder head cover 16, a portion close to a terminal end terminal end-close portion, hereinafter 13b of the rear path portion 13 is bent downward from the start end-close portion 13a, and a terminal end 13c of the rear path portion 13 is connected to the low pressure EGR cooler 10.

According to this, a path length of the rear path portion 13 becomes long by bending the terminal end-close portion 13b, radiation performance of the rear path portion 13 is enhanced, the degree of radiation dependence on the low pressure EGR cooler 10 can be lowered, and it is possible to downsize the low pressure EGR cooler 10.

As shown in FIG. 2, engine cooling water which passes through a cooling water jacket of the cylinder head 15 is used as refrigerant of the low pressure EGR cooler 10 located lower than the cylinder head 15.

According to this, air and vapor which try to stay in the low pressure EGR cooler 10 can easily pass through the cooling water jacket of the cylinder head 15, and it is possible to maintain excellent cooling performance of the low pressure EGR cooler 10.

As shown in FIG. 1, the exhaust gas discharge path 8 extends from the DPF case end 2a on the side of the intake manifold 7, and the rear path portion 13 of the low pressure EGR path 5 branches off from the exhaust gas discharge path 8 on the side of the intake manifold 7.

According to this, the path length of the rear path portion 13 from the exhaust gas discharge path 8 on the side of the intake manifold 7 to the side path portion 14 on the side of the exhaust manifold 6 becomes long, the radiation performance of the rear path portion 13 is enhanced, the degree of radiation dependence on the low pressure EGR cooler 10 can be lowered, and it is possible to downsize the low pressure EGR cooler 10.

Figure 4:
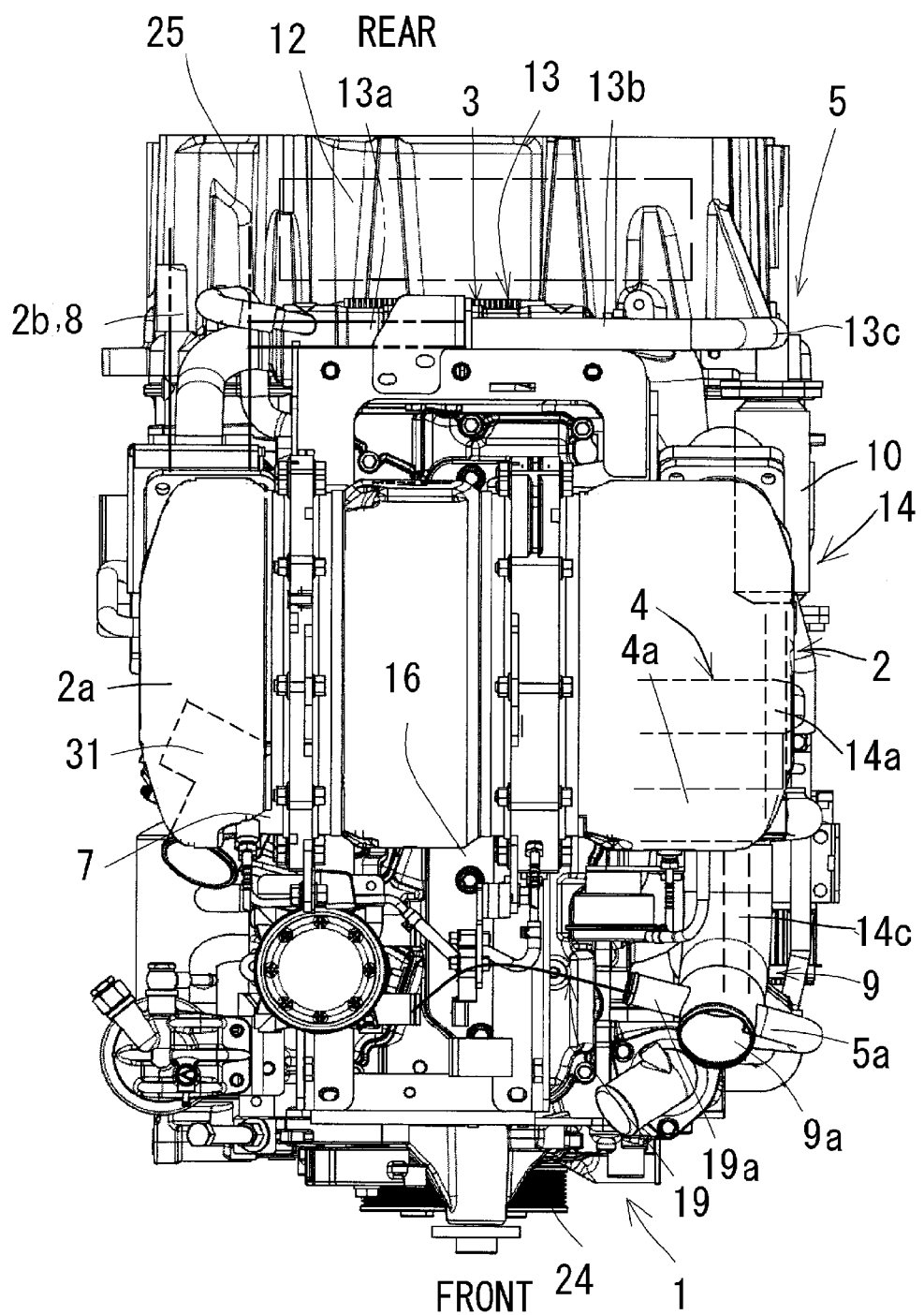
FIG. 4 is a plan view of the engine shown in FIG. 1.
Figure 5:
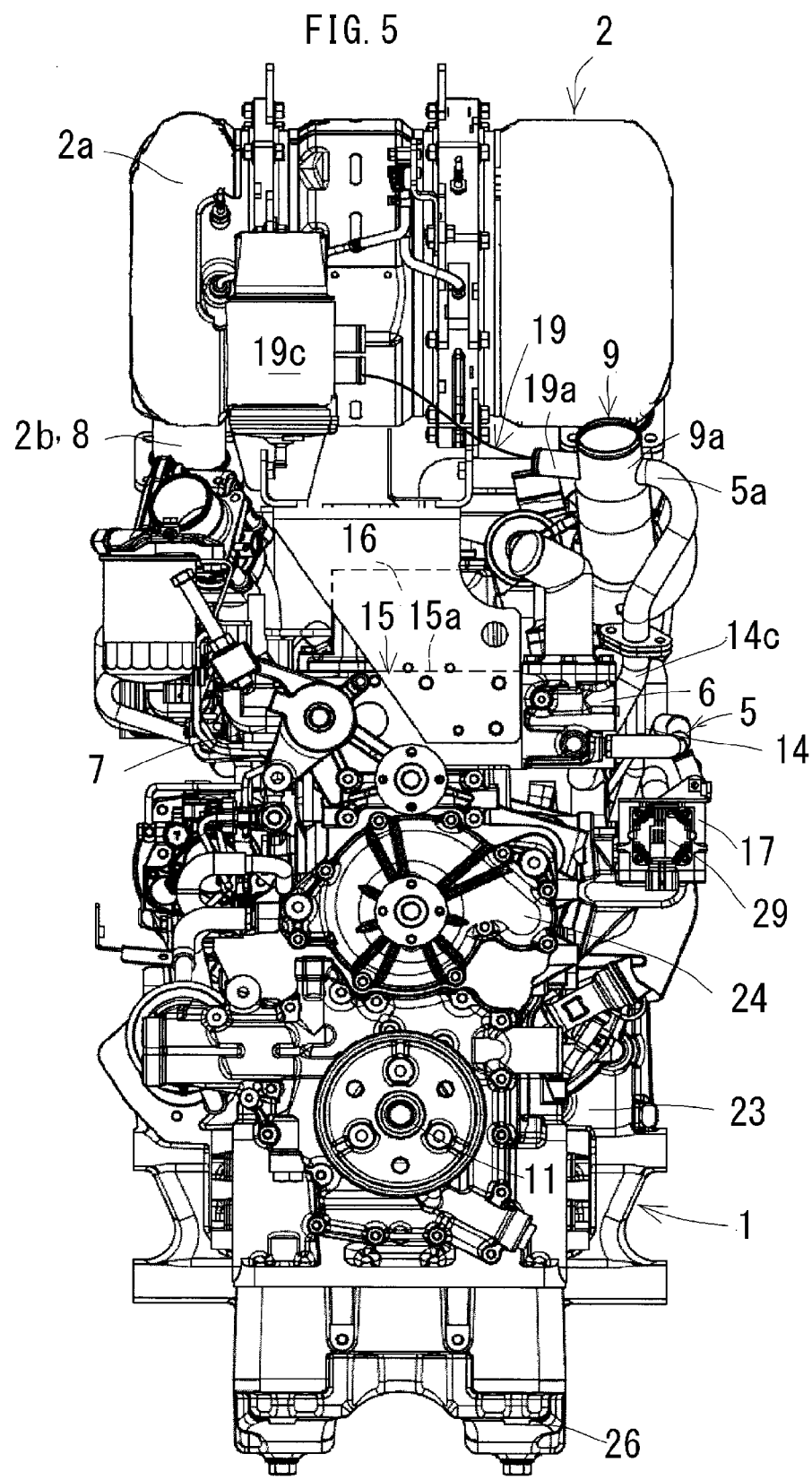
FIG. 5 is a front view of the engine shown in FIG. 1.

As shown in FIG. 4, the DPF case 2 is placed above the engine body 1, and a portion of the side path portion 14 of the low pressure EGR path 5 is placed at a position overlapping with the DPF case 2 as viewed from directly above.

According to this, the portion of the side path portion 14 does not largely project laterally more than the DPF case 2, and an entire width of the engine can be kept short.

As shown in FIG. 4, the supercharger 4 is mounted on the exhaust manifold 6, and a portion of the side path portion 14 of the low pressure EGR path 5 is placed at a position overlapping with the supercharger 4 as viewed from directly above.

According to this, the portion of the side path portion 14 does not largely project laterally more than the supercharger, and the entire width of the engine can be kept short.

As shown in FIG. 2, the side path portion 14 of the low pressure EGR path 5 includes a downward convex bypass path portion 14a which once moves downward and then moves upward. An upper side terminal end 14b of the downward convex bypass path portion 14a is connected to the intake pipe 9.

According to this, a path length of the side path portion 14 becomes long by the downward convex bypass path portion 14a, the degree of radiation dependence on the low pressure EGR cooler 10 can be lowered, and it is possible to downsize the low pressure EGR cooler 10.

As shown in FIG. 2, the low pressure EGR cooler 10 is placed upstream of the downward convex bypass path portion 14a, the low pressure EGR valve case 17 is placed downstream of the downward convex bypass path portion 14a, and a lowest portion 14d of the downward convex bypass path portion 14a is a condensed water reservoir 18 of condensed water which flows out from the low pressure EGR cooler 10 and the low pressure EGR valve case 17.

According to this, condensed water including sulfuric acid component is less prone to stay in the low pressure EGR cooler 10 and the low pressure EGR valve case 17, and it is possible to retard corrosion in the low pressure EGR cooler 10 and the low pressure EGR valve case 17.

Figure 3A:
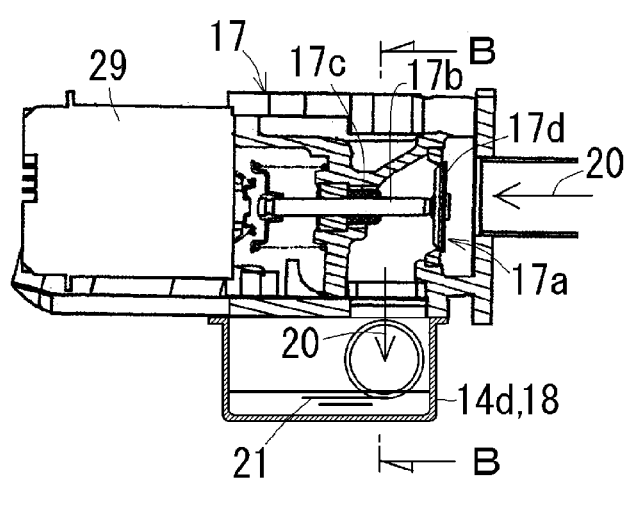
FIG. 3A is a vertical side view of the low pressure valve case.
Figure 3B:
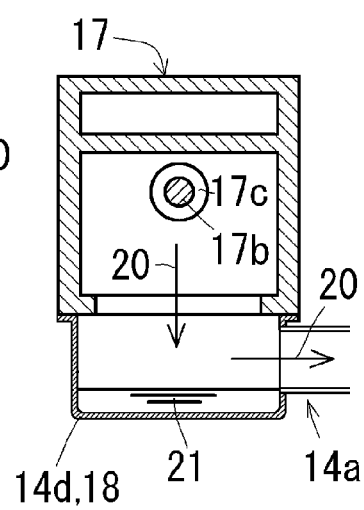
FIG. 3B is a sectional view taken along line B-B in FIG. 3A.

As shown in FIGS. 2, 3A and 3B, the condensed water reservoir 18 is placed in a lower portion of the low pressure EGR valve case 17. According to this, condensed water including sulfuric acid component does not accumulate in the low pressure EGR valve case 17, and it is possible to retard corrosion in the low pressure EGR valve case 17 and an EGR valve 17a.

As shown in FIG. 3A, the low pressure EGR valve case 17 is oriented in a direction extending along a horizontal direction, and a valve stem 17b of the EGR valve 17a is also oriented in a direction extending along the horizontal direction. According to this, there is no deficiency that condensed water including sulfuric acid component is guided to the valve head 17d of the EGR valve 17a along inclinations of the low pressure EGR valve case 17 and the valve stem 17b, and it is possible to retard corrosion of the valve head 17d of the EGR valve 17a.

As shown in FIGS. 3A and 3B, the condensed water reservoir 18 is composed of a cast water saucer. Hence, durability of the condensed water reservoir 18 is high. Although the condensed water reservoir 18 is composed of a cast product of cast iron, a forged product may be used.

The condensed water reservoir 18 is detachably mounted on the low pressure EGR valve case 17. Hence, maintenance in the low pressure EGR valve case 17 and the EGR valve 17a and replacement of the EGR valve 17a are facilitated. The condensed water reservoir 18 is mounted on the low pressure EGR valve case 17 through a bolt.

As shown in FIG. 2, the lowest portion 14d of the downward convex bypass path portion 14a is placed at a position lower than the exhaust manifold 6.

The supercharger 4 is placed on an upper portion of the exhaust manifold 6, the intake pipe 9 includes a diagonally upwardly extending inclined intake pipe portion 9a, and a terminal end 5a of the low pressure EGR path 5 is connected to the inclined intake pipe portion 9a.

According to this, the path length of the low pressure EGR path 5 becomes long by the diagonally upwardly extending inclined intake pipe portion 9a, radiation performance from portions of the engine other than the low pressure EGR cooler 10 is enhanced, a degree of radiation dependence on the low pressure EGR cooler 10 can be lowered, and it is possible to downsize the low pressure EGR cooler 10.

As shown in FIG. 4, a portion of the downward convex bypass path portion 14a is placed below the supercharger 4 at a position overlapping with the supercharger 4 as viewed from directly above.

According to this, the portion of the downward convex bypass path portion 14a does not largely project laterally more than the supercharger 4, and the entire width of the engine can be kept short.

As shown in FIG. 4, a portion of the downward convex bypass path portion 14a is placed below the intake pipe 9 at a position overlapping with the intake pipe 9 as viewed from directly above.

According to this, the portion of the downward convex bypass path portion 14a does not largely project laterally more than the intake pipe 9, and the entire width of the engine can be kept short.

Figure 3C:
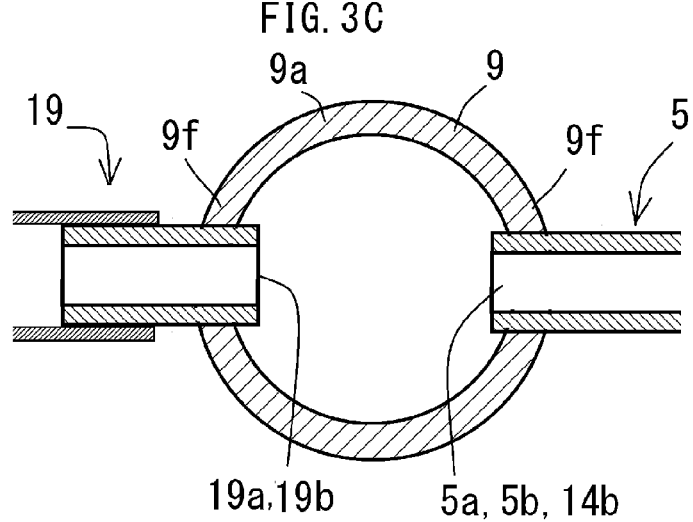
FIG. 3C is a sectional view of the suction passage.

As shown in FIG. 3C, the terminal end 5a of the low pressure EGR path 5 is provided with the low pressure EGR outlet 5b which opens at the intake pipe 9, a terminal end 19a of a blow-by gas passage 19 is provided with a blow-by gas outlet 19b which opens at the intake pipe 9, and the low pressure EGR outlet 5b and the blow-by gas outlet 19b are placed at positions where they are opposed to each other while sandwiching a passage 9b in the intake pipe 9 therebetween.

During a predetermined period of an engine cold start warming-up period including an engine cold start period and a subsequent warming-up period, low pressure EGR gas 20 flows out from the low pressure EGR outlet 5b toward the blow-by gas outlet 19b.

According to this, the blow-by gas outlet 19b is heated by heat of the low pressure EGR gas 20, and it is possible to prevent freezing of the blow-by gas outlet 19b when it is cold.

As shown in FIG. 3C, the laterally oriented low pressure EGR outlet 5b is placed in a lateral peripheral wall 9f of the intake pipe 9.

According to this, water, oil and carbon in blow-by gas 22 which flow out from the blow-by gas outlet 19b are less prone to enter the low pressure EGR outlet 5b, and it is possible to prevent the low pressure EGR outlet 5b from becoming clogged.

The laterally oriented blow-by gas outlet 19b is placed in another lateral peripheral wall 9f of the intake pipe 9 which is opposed to the low pressure EGR outlet 5b.

As shown in FIG. 1, an exhaust gas discharge pipe 2b of the DPF case 2 which configures a start end of the exhaust gas discharge path 8 and which makes the rear path portion 13 of the low pressure EGR path 5 branch off inclines in a direction separating away from the exhaust manifold 6.

According to this, the path length of the rear path portion 13 becomes long, the radiation performance of the rear path portion 13 is enhanced, the degree of radiation dependence on the low pressure EGR cooler 10 can be lowered, and it is possible to downsize the low pressure EGR cooler 10.

An exhaust duct not shown configuring the exhaust gas discharge path 8 is connected to a tip end of the exhaust gas discharge pipe 2b, and an SCR catalyst case is connected to a tip end of the exhaust duct.

In the DPF case 2, a DOC 32 is placed on an upstream side and a DPF 33 is placed on a downstream side. The DOC is a Diesel Oxidation Catalyst and the DPF is a Diesel Particulate Filter.

SCR is a Selective Catalytic Reduction of NOx.

As shown in FIGS. 1 and 2, the high pressure EGR path 3 includes a rear high pressure EGR cooler 27 existing right behind the cylinder head 15, and a side high pressure EGR cooler 28 existing right beside the cylinder head 15. Both the rear high pressure EGR cooler 27 and the side high pressure EGR cooler 28 are placed at positions lower than the upper surface 15a of the cylinder head 15, and engine cooling water passing through the cooling water jacket of the cylinder head 15 is used as refrigerant.

Hence, air and vapor which try to stay in the rear high pressure EGR cooler 27 and the side high pressure EGR cooler 28 easily pass through the cooling water jacket of the cylinder head 15, and it is possible to highly maintain the cooling performance of the low pressure EGR cooler 10.

A pipe portion of the high pressure EGR path 3 that does not include the rear high pressure EGR cooler 27 and the side high pressure EGR cooler 28, and a pipe portion of the low pressure EGR path 5 that does not include the low pressure EGR cooler 10 and the low pressure EGR valve case 17 are composed of metal pipes which easily release heat.

The EGR valve 17a is accommodated in the low pressure EGR valve case 17 shown in FIG. 3, and a periphery of the valve stem 17b is sealed by a stem seal 17c.

A valve actuator 29 is mounted on a front side of the EGR valve case 17, and the EGR valve 17a is opened and closed by the valve actuator 29.

As shown in FIG. 2, an intermediate portion of the blow-by gas passage 19 is provided with an oil separator 19c. As shown in FIG. 4, the oil separator 19c is placed directly above the cylinder head cover 16.

Figure 6:
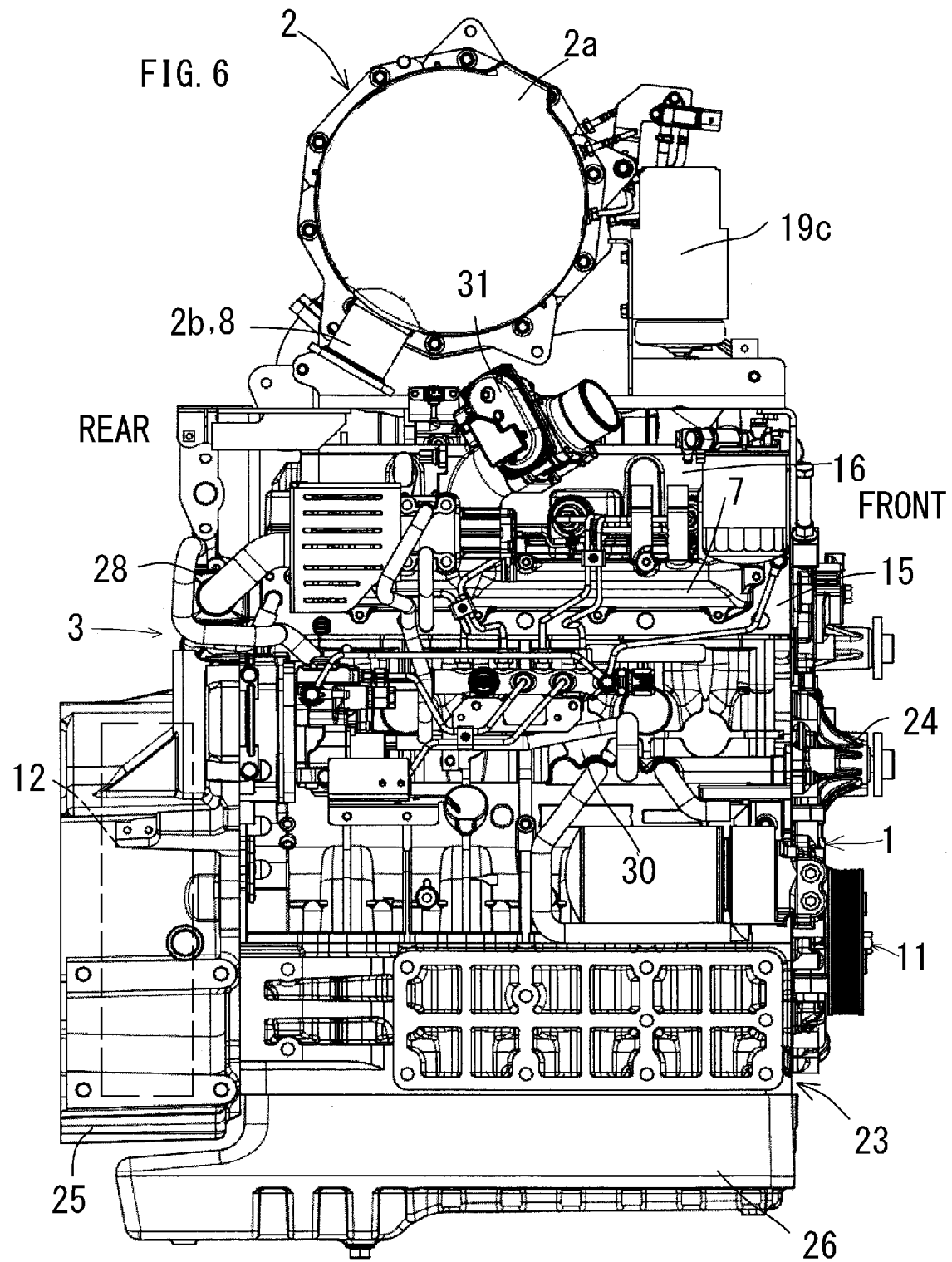
FIG. 6 is a left side view of the engine shown in FIG. 1.
Figure 7:
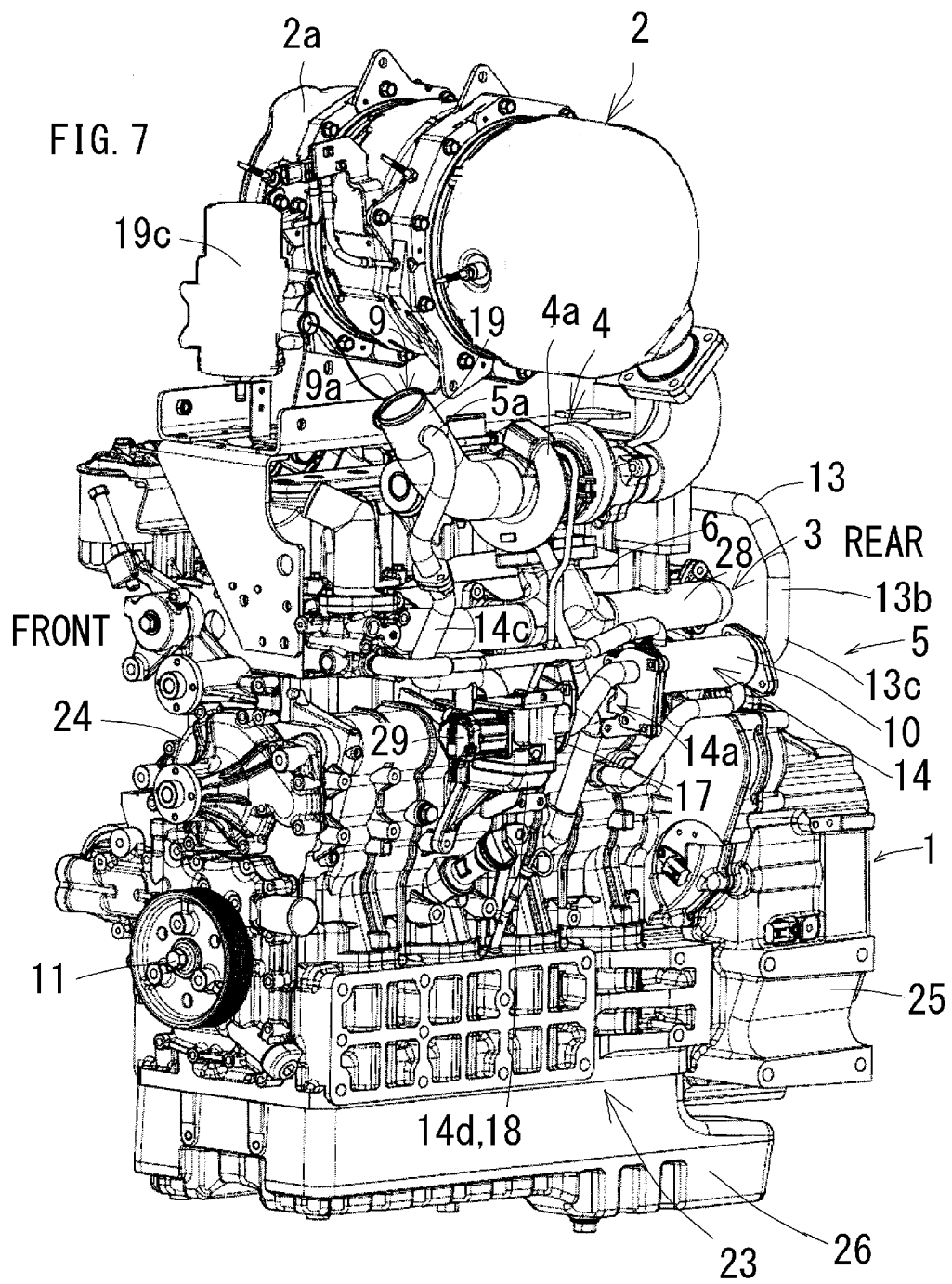
FIG. 7 is a top-down perspective view of the engine shown in FIG. 1 as viewed from right and front.
Figure 8:
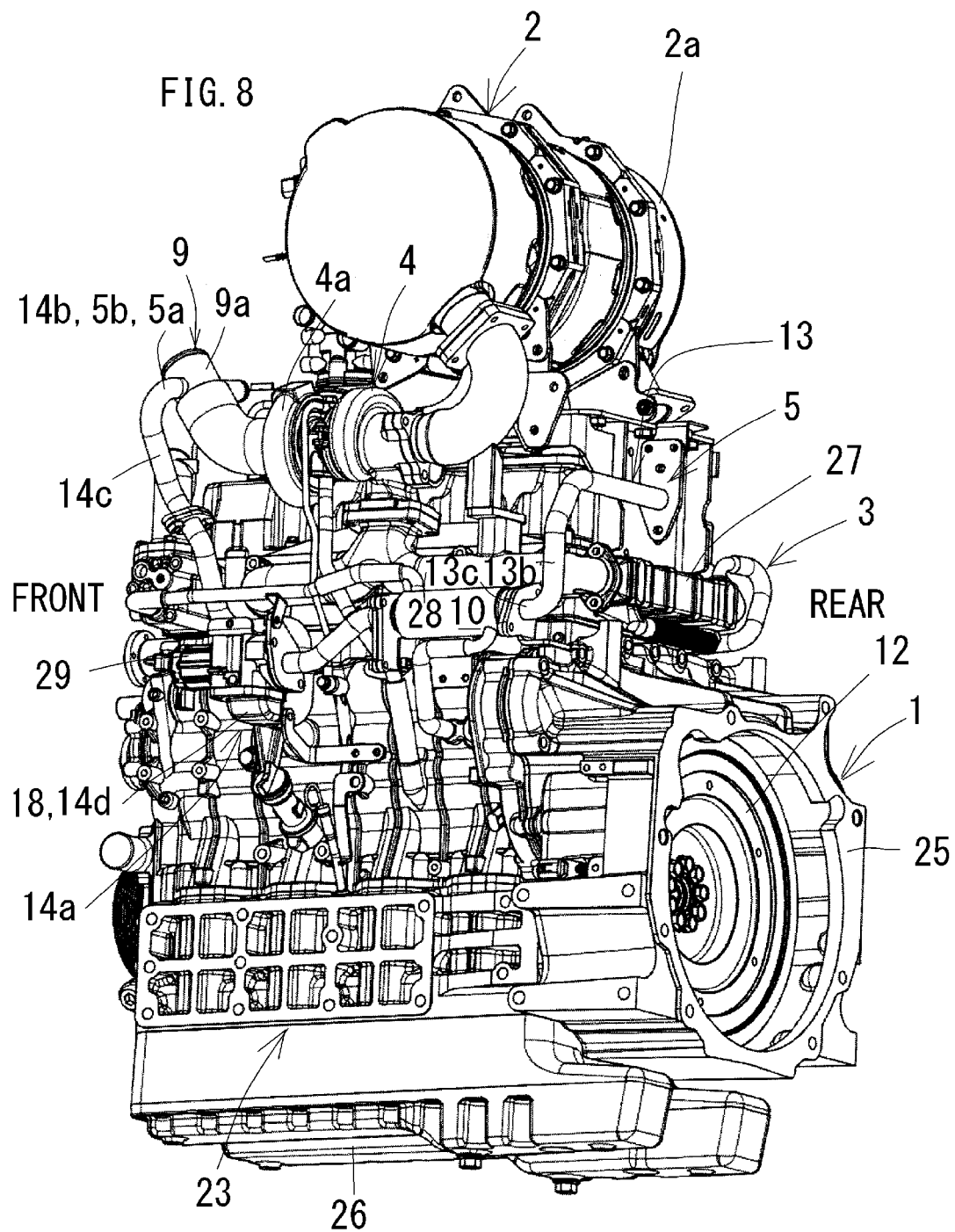
FIG. 8 is a stare-up perspective view of the engine shown in FIG. 1 as viewed from diagonally left and below.
Figure 9:
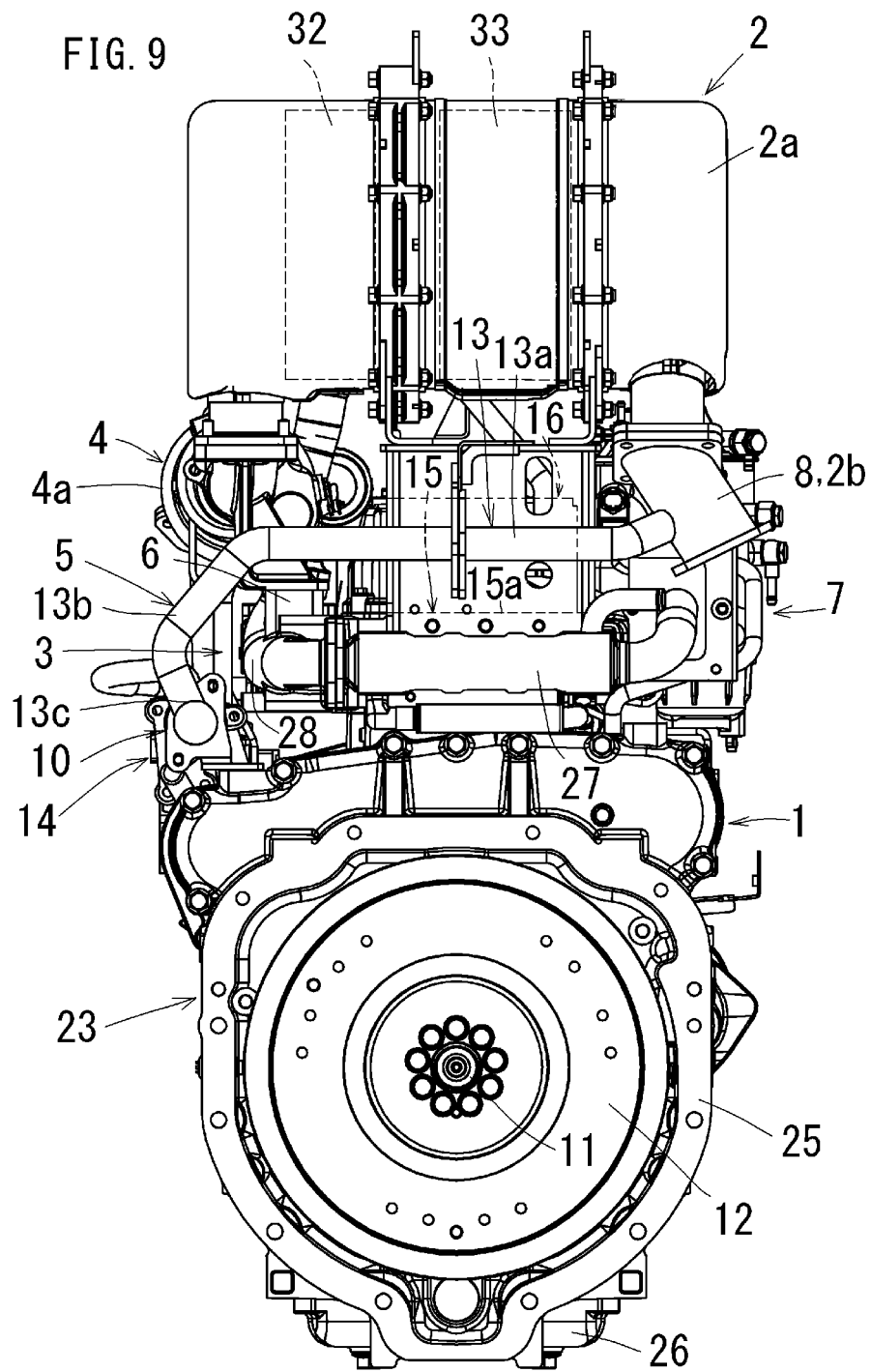
FIG. 9 is a back view of an engine according to a second embodiment of the present invention.

As shown in FIG. 6, a common rail system 30 and an electronic throttle device 31 are placed on the engine body on the side of the intake manifold 7. As shown in FIG. 4, the electronic throttle device 31 is placed directly above the intake manifold 7.

Contents of the first embodiment are as explained above.

A second embodiment is different from the first embodiment in the following points. Other points of the second embodiment are the same as those of the first embodiment. In FIGS. 9 to 15, the same reference signs are allocated to the same elements as those in the first embodiment shown in FIGS. 1 to 8.

Figure 12:
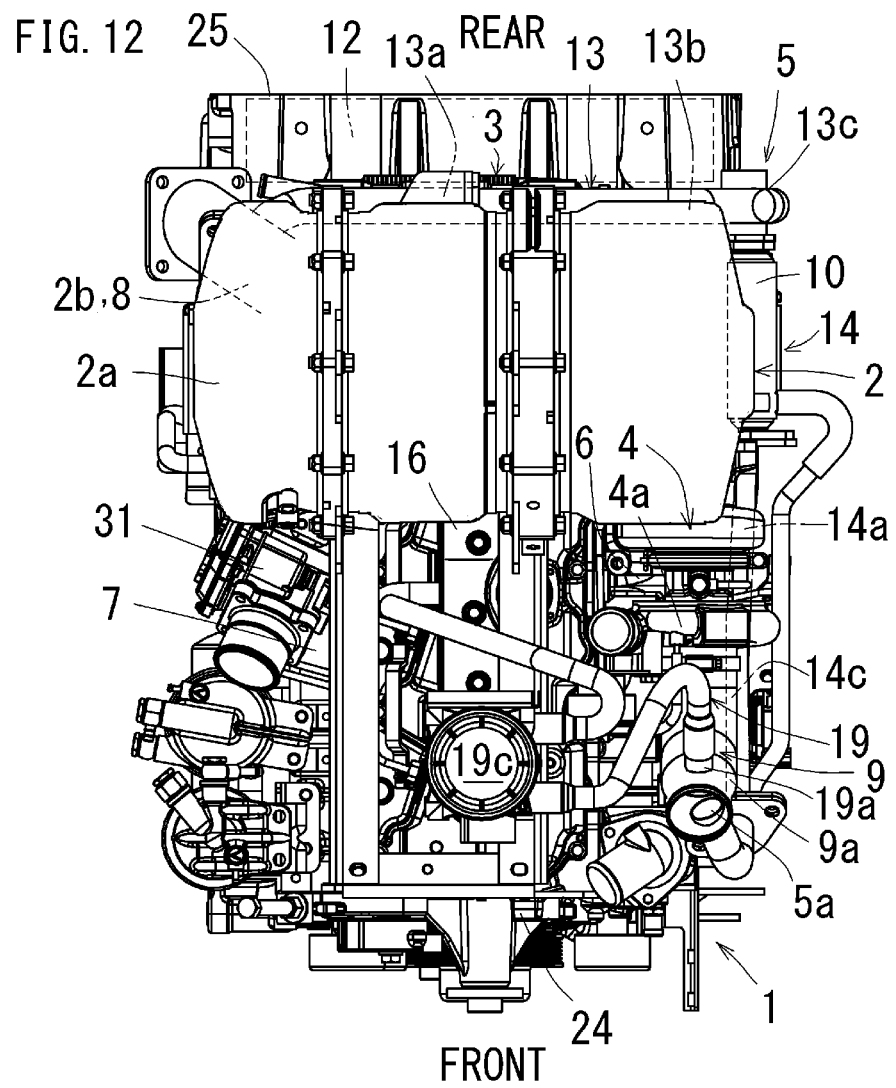
FIG. 12 is a plan view of the engine shown in FIG. 9.
Figure 13:
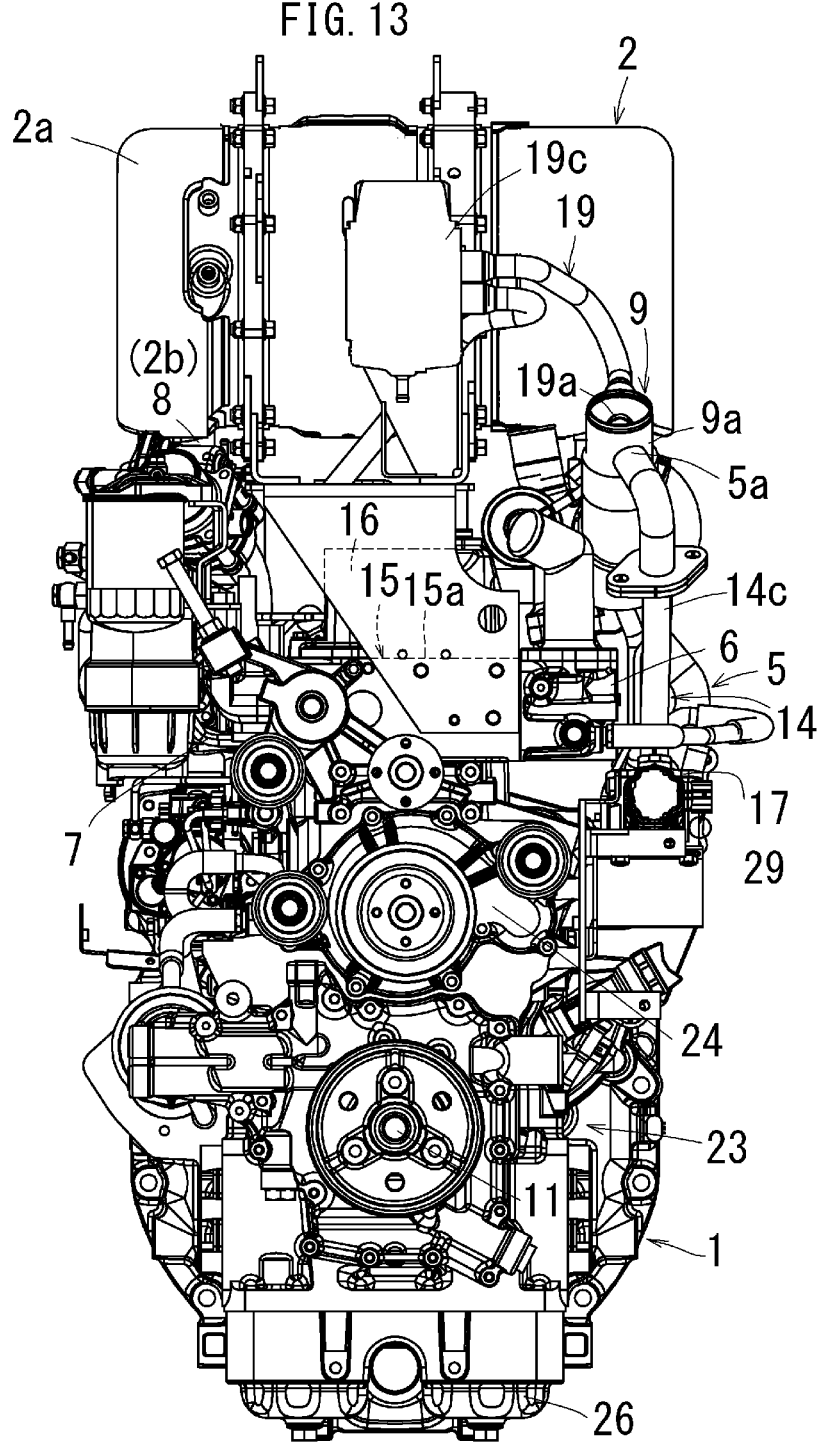
FIG. 13 is a front view of the engine shown in FIG. 9.
Figure 14:
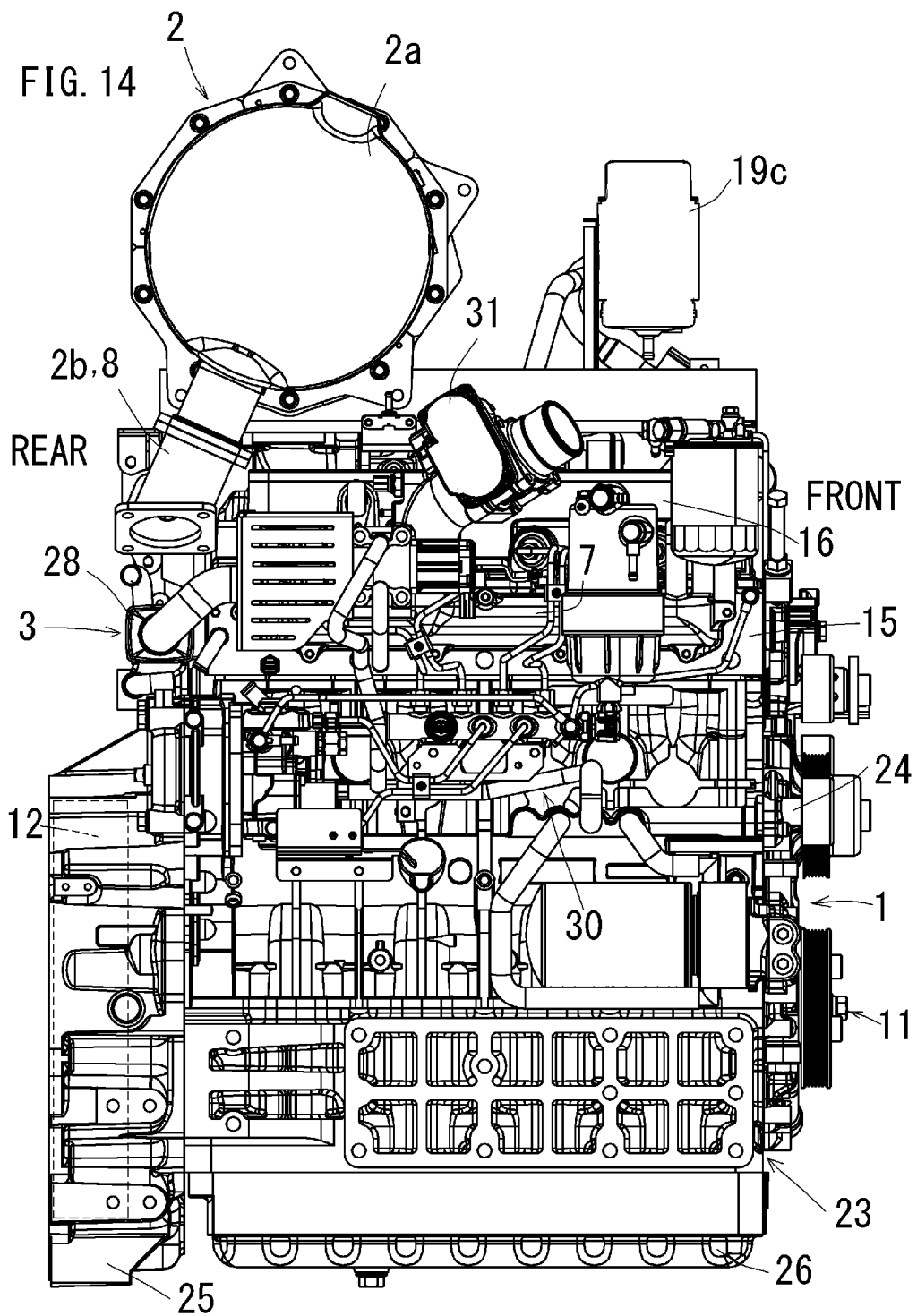
FIG. 14 is a left side view of the engine shown in FIG. 9.
Figure 15:
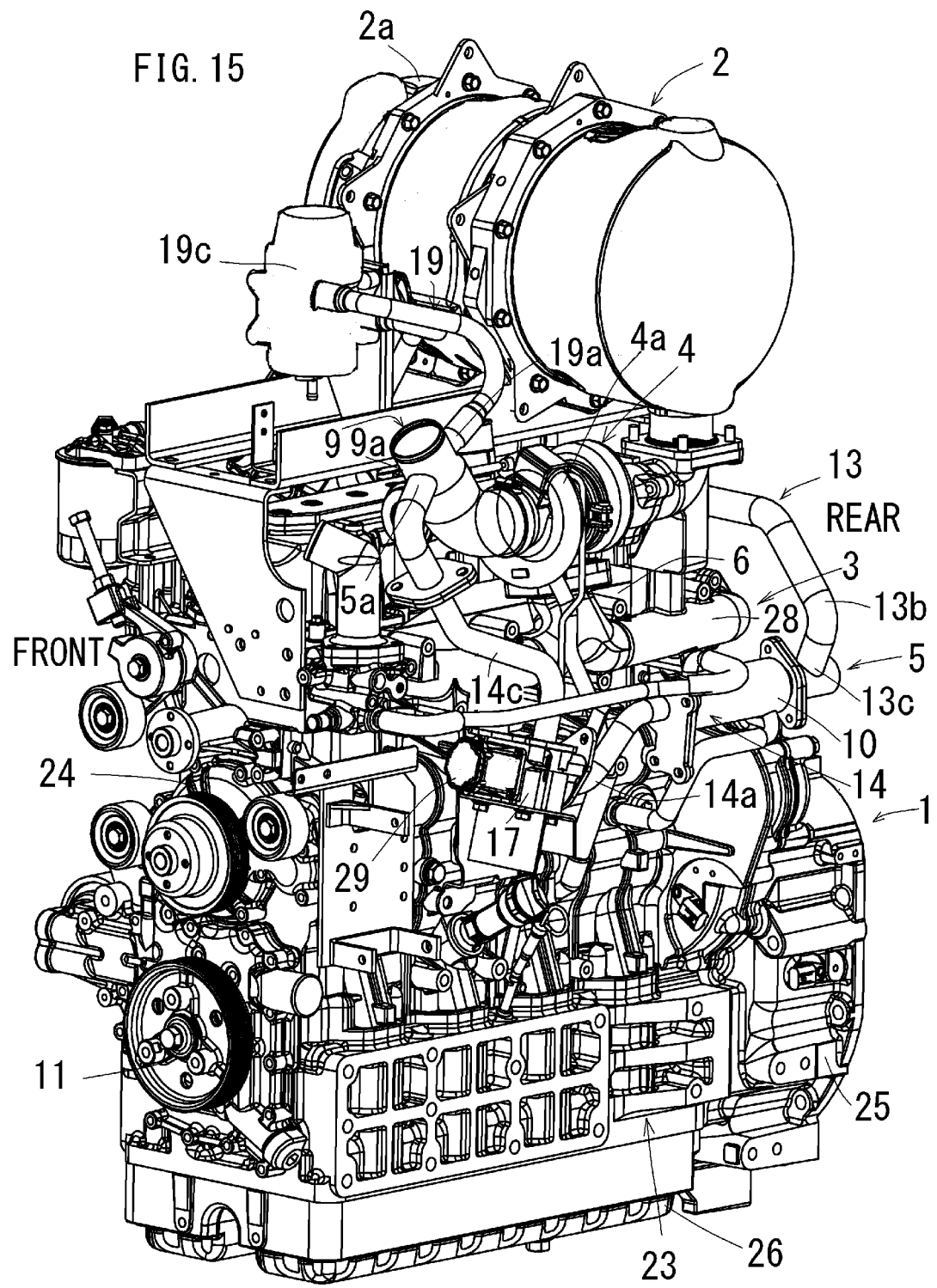
FIG. 15 is a top-down perspective view of the engine shown in FIG. 9 as viewed from right and front.

As shown in FIG. 12, a DPF case 2 is placed above an engine body 1.

An exhaust gas discharge path 8 and a rear path portion 13 of a low pressure EGR path 5 are placed below the DPF case 2 at positions overlapping with the DPF case 2 as viewed from directly above.

According to this, the exhaust gas discharge path 8 and the rear path portion 13 of the low pressure EGR path 5 do not largely project rearward more than the DPF case 2, and an entire length of an engine can be kept short.

As shown in FIG. 4, a high pressure EGR path 3 is placed below the DPF case 2 at a position overlapping with the DPF case 2 as viewed from directly above.

According to this, the high pressure EGR path 3 does not largely project rearward and laterally more than the DPF case 2, and an entire length and an entire width of the engine can be kept short.

Figure 10:
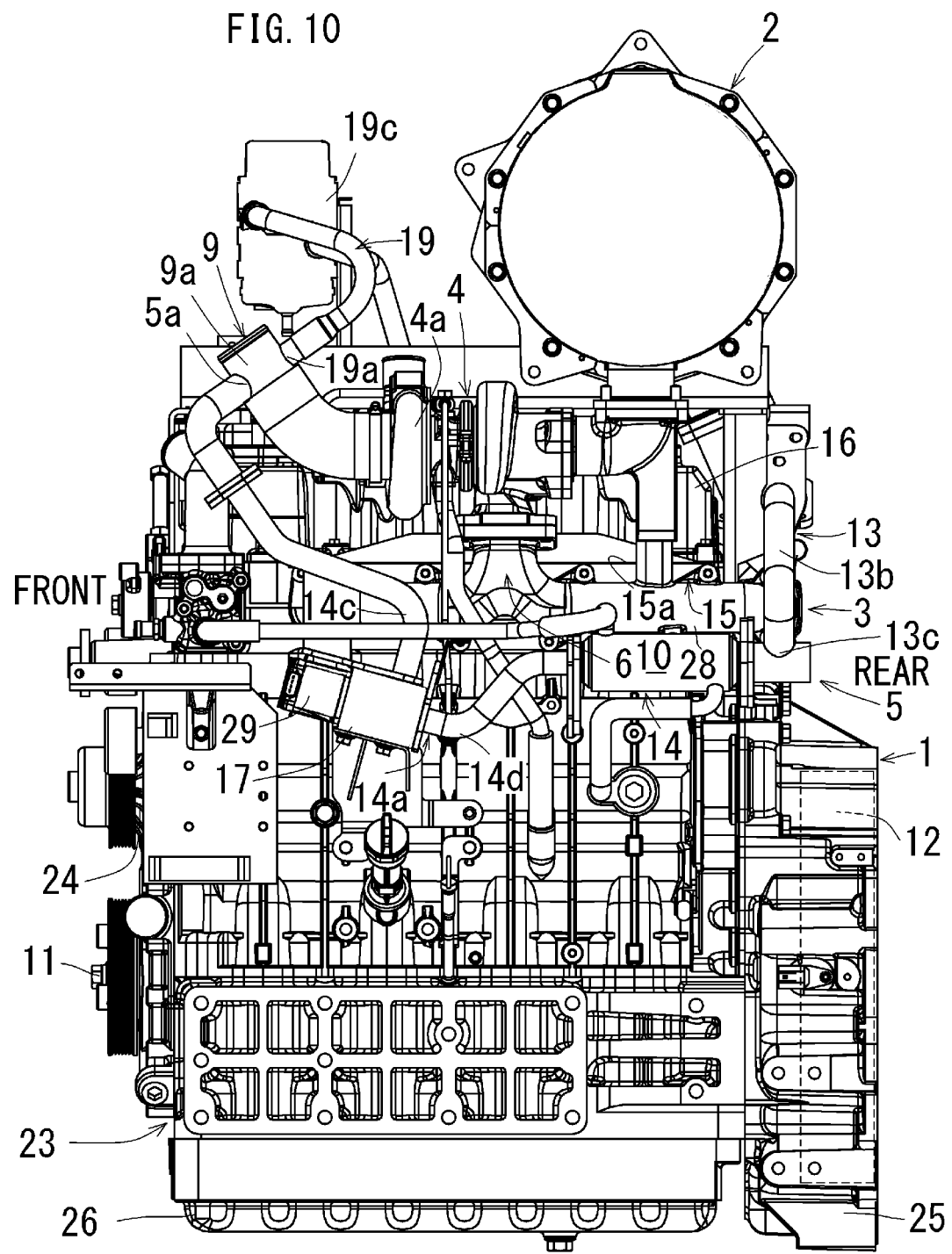
FIG. 10 is a right side view of the engine shown in FIG. 9.
Figure 11:
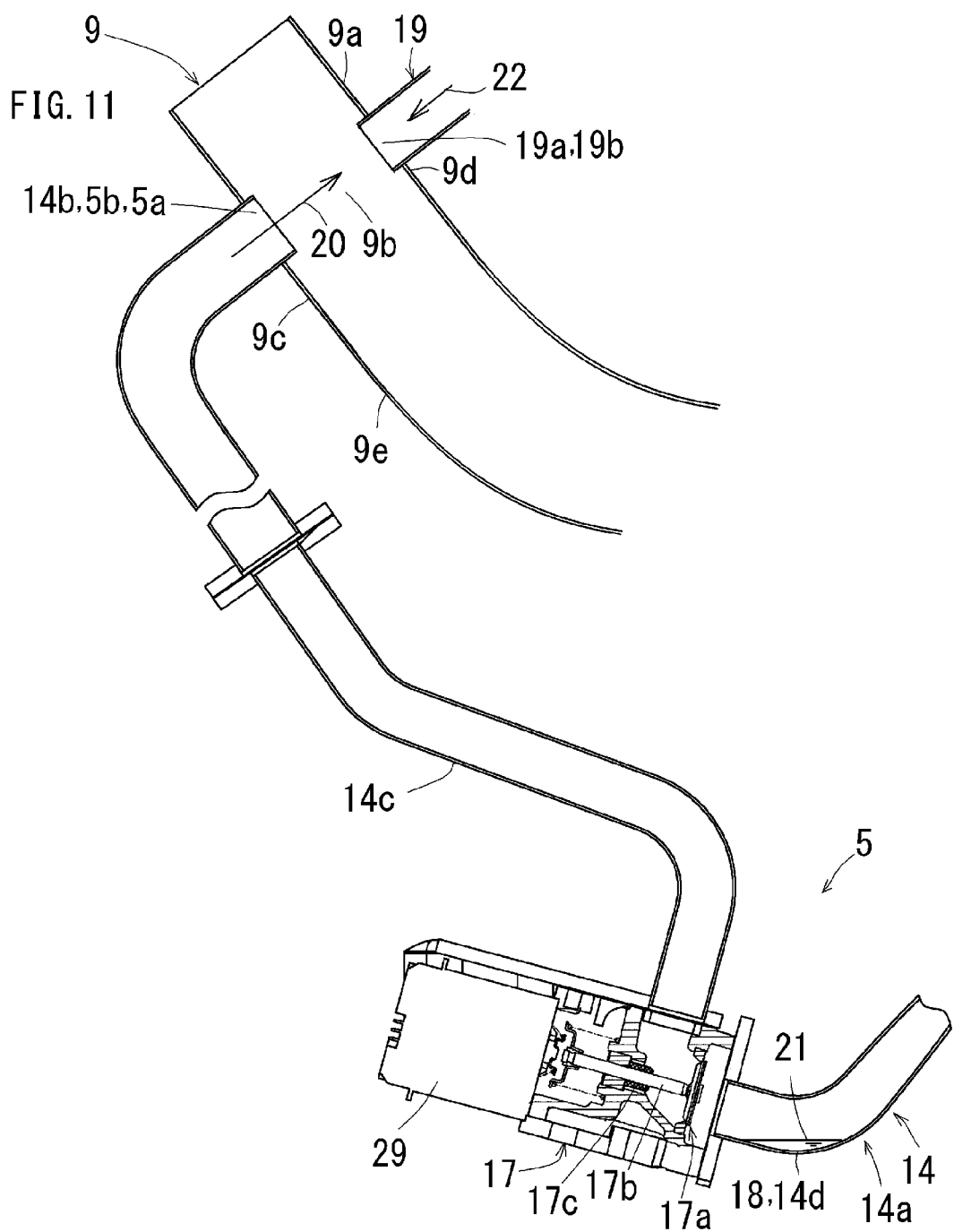
FIG. 11 is a vertical sectional side view of a downward convex bypass path, a low pressure EGR valve case and an intake pipe used in the engine shown in FIG. 9.

As shown in FIGS. 10 and 11, a low pressure EGR valve case 17 inclines downward toward a condensed water reservoir 18.

According to this, condensed water 21 including sulfuric acid component is less prone to stay in the low pressure EGR valve case 17, and it is possible to retard corrosion in the low pressure EGR valve case 17.

The low pressure EGR valve case 17 is placed on a lower bypass path portion 14a.

An EGR valve 17a, a valve stem 17b and a stem seal 17c incline downward toward the condensed water reservoir 18 like the low pressure EGR valve case 17.

According to this, even if the condensed water 21 including sulfuric acid component adheres to the EGR valve 17a, the valve stem 17b and the stem seal 17c, the condensed water 21 easily flows toward the condensed water reservoir 18.

A valve actuator 29 also inclines downward toward the condensed water reservoir 18 like the low pressure EGR valve case 17.

As shown in FIGS. 10 and 11, a rising path portion 14c of a downward convex bypass path portion 14a bends along a shape of an intake pipe 9.

According to this, a path length of the rising path portion 14c becomes long by the bent shape, radiation performance from portions of the engine other than the low pressure EGR cooler 10 is enhanced, a degree of radiation dependence on the low pressure EGR cooler 10 can be lowered, and it is possible to downsize the low pressure EGR cooler 10.

As shown in FIG. 11, the intake pipe 9 includes a diagonally upwardly extending inclined intake pipe portion 9a, a low pressure EGR outlet 5b is placed in a lower peripheral wall 9c of the inclined intake pipe portion 9a, and a blow-by gas outlet 19b is placed in an upper peripheral wall 9d of the inclined intake pipe portion 9a.

The low pressure EGR outlet 5b is placed at a position higher than a directly-below position 9e of the lower peripheral wall 9c, the directly-below position 9e being located directly below the blow-by gas outlet 19b.

According to this, water, oil and carbon in blow-by gas 22 which flow out from the blow-by gas outlet 19b are less prone to enter the low pressure EGR outlet 5b, and it is possible to prevent the low pressure EGR outlet 5b from becoming clogged.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An engine comprising an engine body, a DPF case, a high pressure EGR path, a supercharger and a low pressure EGR path, in which the high pressure EGR path is interposed between an exhaust manifold and an intake manifold, an exhaust gas discharge path extends from the DPF case, an intake pipe extends from an air compressor of the supercharger, the low pressure EGR path is interposed between the exhaust gas discharge path of the DPF case and the intake pipe, and the low pressure EGR path is provided with a low pressure EGR cooler, wherein the DPF case is installed in an engine body, and when an extending direction of a crankshaft is defined as a longitudinal direction and a flywheel is defined as existing on a rear side and a width direction of the engine body is defined as a lateral direction, the low pressure EGR path includes a rear path portion extending along a rear side of the engine body, and a side path portion extending along a lateral side of the engine body on a side close to the exhaust manifold, and wherein the side path portion of the low pressure EGR path includes a downward convex bypass path portion which extends downward and then upward, and an upper side terminal end of the downward convex bypass path portion is connected to the intake pipe.

2. The engine according to claim 1, wherein the low pressure EGR cooler is placed upstream of the downward convex bypass path portion, the low pressure EGR valve case is placed on the downward convex bypass path portion, and a lowest portion of the downward convex bypass path portion is a condensed water reservoir for condensed water which flows out from the low pressure EGR cooler and the low pressure EGR valve case.

3. The engine according to claim 2, wherein the condensed water reservoir is placed in a lower portion of the low pressure EGR valve case.

4. The engine according to claim 3, wherein the low pressure EGR valve case is oriented to a direction extending along a horizontal direction, and a valve stem of an EGR valve is also oriented to a direction extending along the horizontal direction.

5. The engine according to claim 4, wherein the condensed water reservoir is detachably mounted on the low pressure EGR valve case.

6. The engine according to claim 3, wherein the condensed water reservoir is composed of a cast or forged water saucer.

7. The engine according to claim 2, wherein the low pressure EGR valve case downwardly inclines toward the condensed water reservoir.

8. The engine according to claim 1, wherein the lowest portion of the downward convex bypass path portion is placed at a position lower than the exhaust manifold, the supercharger is placed on an upper portion of the exhaust manifold, the intake pipe includes a diagonally upwardly extending inclined intake pipe portion, and a terminal end of the low pressure EGR path is connected to the inclined intake pipe portion.

9. The engine according to claim 1, wherein a rising path portion of the downward convex bypass path portion is bent along a shape of the intake pipe.

10. The engine according to claim 1, wherein a portion of the downward convex bypass path portion is placed below the supercharger at a position overlapping with the supercharger as viewed from directly above.

11. The engine according to claim 1, wherein a portion of the downward convex bypass path portion is placed below the intake pipe at a position overlapping with the intake pipe as viewed from directly above.

12. The engine according to claim 1, wherein the low pressure EGR cooler is placed on a side path portion of the low pressure EGR path at a position lower than an upper surface of a cylinder head, a start end-close portion of a rear path portion of the low pressure EGR path is placed right behind a cylinder head cover, a terminal end-close portion of the rear path portion is bent downward from the start end-close portion, and a terminal end of the rear path portion is connected to the low pressure EGR cooler.

13. The engine according to claim 12, wherein engine cooling water which passes through a cooling water jacket of the cylinder head is used as refrigerant of the low pressure EGR cooler which is lower than the cylinder head.

14. The engine according to claim 1, wherein the exhaust gas discharge path extends from a DPF case end on a side close to the intake manifold, and the rear path portion of the low pressure EGR path branches off from the exhaust gas discharge path on the side of the intake manifold.

15. The engine according to claim 1, wherein the DPF case is placed above the engine body, and the exhaust gas discharge path and the rear path portion of the low pressure EGR path are placed below the DPF case at positions overlapping with the DPF case as viewed from directly above.

16. The engine according to claim 1, wherein the DPF case is placed above the engine body, and a portion of the side path portion of the low pressure EGR path is placed at a position overlapping with the DPF case as viewed from directly above.

17. The engine according to claim 1, wherein the supercharger is mounted on the exhaust manifold, and a portion of the side path portion of the low pressure EGR path is placed at a position overlapping with the supercharger as viewed from directly above.

18. The engine according to claim 1, wherein the high pressure EGR path is placed below the DPF case at a position overlapping with the DPF case as viewed from directly above.

19. An engine comprising an engine body, a DPF case, a high pressure EGR path, a supercharger and a low pressure EGR path, in which the high pressure EGR path is interposed between an exhaust manifold and an intake manifold, an exhaust gas discharge path extends from the DPF case, an intake pipe extends from an air compressor of the supercharger, the low pressure EGR path is interposed between the exhaust gas discharge path of the DPF case and the intake pipe, and the low pressure EGR path is provided with a low pressure EGR cooler, wherein the DPF case is installed in an engine body, and when an extending direction of a crankshaft is defined as a longitudinal direction and a flywheel is defined as existing on a rear side and a width direction of the engine body is defined as a lateral direction, the low pressure EGR path includes a rear path portion extending along a rear side of the engine body, and a side path portion extending along a lateral side of the engine body on a side close to the exhaust manifold, and wherein a terminal end of the low pressure EGR path is provided with a low pressure EGR outlet which opens at the intake pipe, a terminal end of the blow-by gas passage is provided with a blow-by gas outlet which opens at the intake pipe, the low pressure EGR outlet and the blow-by gas outlet are placed at positions opposed to each other while sandwiching a passage in the intake pipe therebetween, and during a predetermined period of an engine cold start warming-up period including an engine cold start period and a subsequent warming-up period, low pressure EGR gas flows out from the low pressure EGR outlet toward the blow-by gas outlet.

20. The engine according to claim 19, wherein the low pressure EGR outlet which is oriented laterally is placed in a lateral peripheral wall of the intake pipe.

21. The engine according to claim 19, wherein the intake pipe includes a diagonally upwardly extending inclined intake pipe portion, the low pressure EGR outlet is placed in a lower peripheral wall of the inclined intake pipe portion, a blow-by gas outlet is placed in an upper peripheral wall of the inclined intake pipe portion, and the low pressure EGR outlet is placed at a position higher than a directly-below position of the lower peripheral wall, the directly-below position being located directly below the blow-by gas outlet.

* * * * *